United States Patent
Huang et al.

(10) Patent No.: US 8,857,192 B2
(45) Date of Patent: Oct. 14, 2014

(54) ACCESSORY GEARBOX WITH A STARTER/GENERATOR

(75) Inventors: Hao Huang, Troy, OH (US); Jan Zywot, Centerville, OH (US)

(73) Assignee: General Electric Company, Schenectady, NY (US)

(*) Notice: Subject to any disclaimer, the term of this patent is extended or adjusted under 35 U.S.C. 154(b) by 1138 days.

(21) Appl. No.: 12/763,441

(22) Filed: Apr. 20, 2010

(65) Prior Publication Data
US 2011/0252807 A1 Oct. 20, 2011

(51) Int. Cl.
*F02C 7/32* (2006.01)
*F02C 7/275* (2006.01)
*B64D 41/00* (2006.01)
*F02C 7/36* (2006.01)

(52) U.S. Cl.
CPC . *F02C 7/36* (2013.01); *F02C 7/275* (2013.01); *Y02T 50/671* (2013.01); *Y02T 50/44* (2013.01); *B64D 41/00* (2013.01); *F02C 7/32* (2013.01)
USPC .......................................................... 60/788

(58) Field of Classification Search
CPC ............ F02C 7/32; F02C 7/277; F02C 7/268; F02C 7/275; H02K 7/10; H02K 7/20
USPC ................... 60/788, 39.13, 778, 786
See application file for complete search history.

(56) References Cited

U.S. PATENT DOCUMENTS

| | | | |
|---|---|---|---|
| 3,577,002 A * | 5/1971 | Hall et al. ........................ 290/46 |
| 3,714,779 A | 2/1973 | Stein et al. | |
| 4,473,752 A | 9/1984 | Cronin | |
| 4,525,995 A | 7/1985 | Clark | |
| 4,724,331 A | 2/1988 | Nordlund | |
| 4,797,590 A | 1/1989 | Raad et al. | |
| 4,990,807 A | 2/1991 | Flygare et al. | |
| 5,023,537 A * | 6/1991 | Baits .............................. 318/732 |
| 5,068,590 A * | 11/1991 | Glennon et al. ................. 322/10 |
| 5,191,254 A | 3/1993 | Raad et al. | |
| 5,267,433 A * | 12/1993 | Burch ............................ 60/788 |
| 5,555,722 A | 9/1996 | Mehr-Ayin et al. | |
| 6,058,791 A | 5/2000 | Brunet | |
| 6,204,577 B1 | 3/2001 | Chottiner et al. | |
| 6,838,778 B1 | 1/2005 | Kandil et al. | |
| 7,131,275 B2 | 11/2006 | Gustafson | |
| 7,351,174 B2 | 4/2008 | Beutin et al. | |

(Continued)

FOREIGN PATENT DOCUMENTS

CN 101235753 A 8/2008
CN 101389841 A 3/2009

(Continued)

OTHER PUBLICATIONS

Chinese Office Action for Counterpart CN201110107905.5 mailed Apr. 1, 2014.

*Primary Examiner* — Lindsay Low
*Assistant Examiner* — Jacob Amick
(74) *Attorney, Agent, or Firm* — McGarry Bair PC

(57) ABSTRACT

An assembly for a gas turbine engine comprising an accessory gearbox comprising a drive gear and a starter/generator mechanically mounted to the accessory gearbox. The starter/generator comprising a rotatable shaft, a pinion gear carried by the shaft, a main machine carried by the shaft, a permanent magnet generator (PMG) carried by the shaft and an exciter carried by the shaft.

15 Claims, 3 Drawing Sheets

(56) References Cited

U.S. PATENT DOCUMENTS

| | | |
|---|---|---|
| 7,495,361 B2 | 2/2009 | Brouillet et al. |
| 7,656,054 B2 | 2/2010 | Lardellier |
| 2004/0106486 A1 | 6/2004 | Jonsson |
| 2006/0087123 A1 | 4/2006 | Stout et al. |
| 2006/0248865 A1 | 11/2006 | Latulipe et al. |
| 2007/0029804 A1* | 2/2007 | Nelson ............................ 290/52 |
| 2008/0053257 A1 | 3/2008 | Dusserre-Telmon et al. |
| 2008/0238098 A1* | 10/2008 | Becquerelle et al. ............. 290/3 |
| 2009/0309461 A1 | 12/2009 | Berenger et al. |
| 2012/0118103 A1* | 5/2012 | Blewett et al. .................. 74/7 C |

FOREIGN PATENT DOCUMENTS

| | | |
|---|---|---|
| EP | 0540192 A1 | 5/1993 |
| EP | 1397584 A1 | 3/2004 |
| GB | 839961 A | 6/1960 |
| WO | 2005073540 A1 | 8/2005 |
| WO | 2007096493 A1 | 8/2007 |

\* cited by examiner

ACCESSORY GEARBOX WITH A STARTER/GENERATOR

BACKGROUND OF THE INVENTION

Gas turbine engines, also known as combustion turbine engines are rotary engines that extract energy from a flow of combusted gases passing through the engine onto a multitude of turbine blades. Gas turbine engines have been used for land and nautical locomotion and power generation, but are most commonly used for aeronautical applications such as for airplanes and helicopters. In airplanes gas turbine engines are used for propulsion of the aircraft.

Gas turbine engines also usually power a number of different accessories such as generators, starter/generators, permanent magnet alternators (PMA), fuel pumps, and hydraulic pumps. All these equipment provide for functions needed on the aircraft other than moving the aircraft. For example, when the gas turbine engine is running the starter generator (S/G) produces electrical power and when the gas turbine needs to be started the S/G serves as a starting motor when provided energy from another energy source.

BRIEF DESCRIPTION OF THE INVENTION

One embodiment of the invention relates to an assembly for a gas turbine engine comprising an accessory gearbox with a drive gear located within a first housing having an access opening, and a starter/generator having a second housing mechanically mounted to the first housing. The starter/generator comprises a pinion gear, a main machine, a permanent magnet generator (PMG,) an exciter, and a shaft. The shaft has a portion rotatably mounted within the second housing and a portion supporting the pinion gear, main machine, PMG, and exciter, with the PMG and exciter supported on the portion of the shaft between the pinion gear and the main machine. The first and second housings are configured to nest such that when the second housing is mounted to the first housing, a portion of the second housing extends through the access opening and into the first housing to position at least one of the PMG and exciter within the first housing. The second housing projects from the first housing on only one side of the first housing, which meshes with the drive gear when the starter/generator is mounted to the accessory gearbox.

DETAILED DESCRIPTION OF THE INVENTION

The present invention is related to coupling of a starter/generator (S/G) containing more than one component on to an accessory gear box (AGB), also known as a transmission housing. The S/G mounted to the AGB has various applications including starting a gas turbine engine that the AGB is mechanically coupled to and to generate electrical power when the gas turbine engine is in operation.

Figure 1:
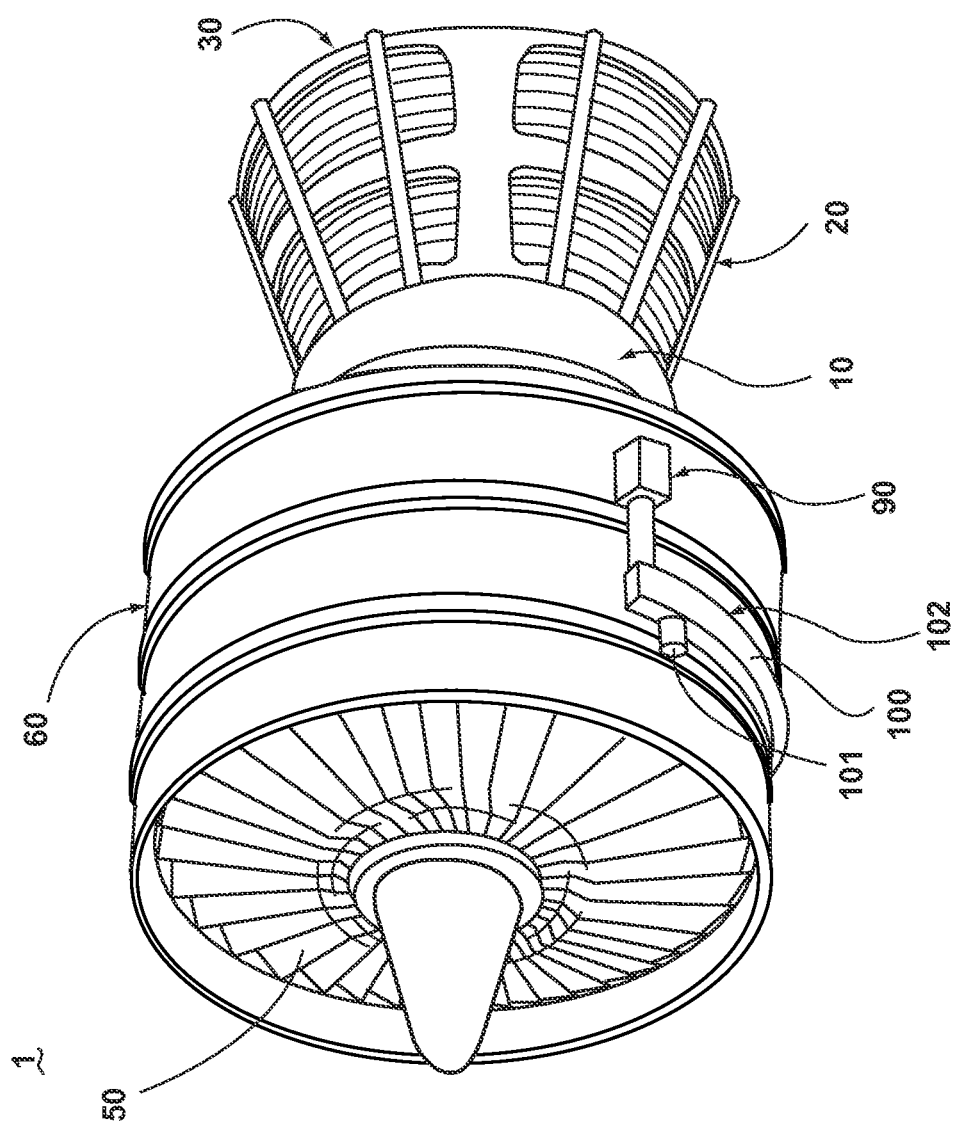
FIG. 1 is a schematic illustration of a gas turbine engine with an accessory gearbox.

Referring to FIG. 1, an assembly 102 comprising the AGB 100 and the S/G 101 is schematically illustrated mounted to the gas turbine engine 1. This assembly is commonly referred to as an Integrated Starter/Generator Gearbox (ISGB). The gas turbine engine 1 comprises an air intake with a fan 50 at the air intake that supplies air to a high pressure compression region 60. The air intake with a fan 50 and the high pressure compression region collectively are known as the 'cold section' of the gas turbine engine upstream of the combustion. The high pressure compression region 60 provides the combustion chamber 10 with high pressure air. In the combustion chamber the high pressure air is mixed with fuel and combusted. The hot and pressurized combusted gas passes through a high pressure turbine region 20 and a low pressure turbine region 30 before exhausting from the gas turbine engine. As the pressurized gases pass through the high pressure turbine (not shown) of the high pressure turbine region 20 and the low pressure turbine (not shown) of the low pressure turbine region 30 the turbines extract rotational energy from the flow of the gases passing through the gas turbine engine 1. The high pressure turbine of the high pressure turbine region 20 may be coupled to the compression mechanism (not shown) of the high pressure compression region 60 by way of a shaft to power the compression mechanism. The low pressure turbine may be coupled to the fan 50 of the air intake by way of a shaft to power the fan 50.

The gas turbine engine may be a turbofan engine, such as a General Electric GEnx or CF6 series engine, commonly used in modern commercial and military aviation or it could be a variety of other known gas turbine engines such as a turboprop or turboshaft. The gas turbine engine may also have an afterburner that burns an additional amount of fuel downstream of the low pressure turbine region 30 to increase the velocity of the exhausted gases, and thereby increasing thrust.

The accessory gearbox (AGB) 100 is coupled to a turbine shaft of the gas turbine engine 1, either to the low pressure or high pressure turbine by way of a mechanical power take off 90. The mechanical power take off contains multiple gears and means for mechanical coupling of the AGB 100 to the gas turbine engine. The assembly 102 may be mounted on the outside of either the air intake region containing the fan 50 or on the core near the high pressure compression region 60.

Figure 2:
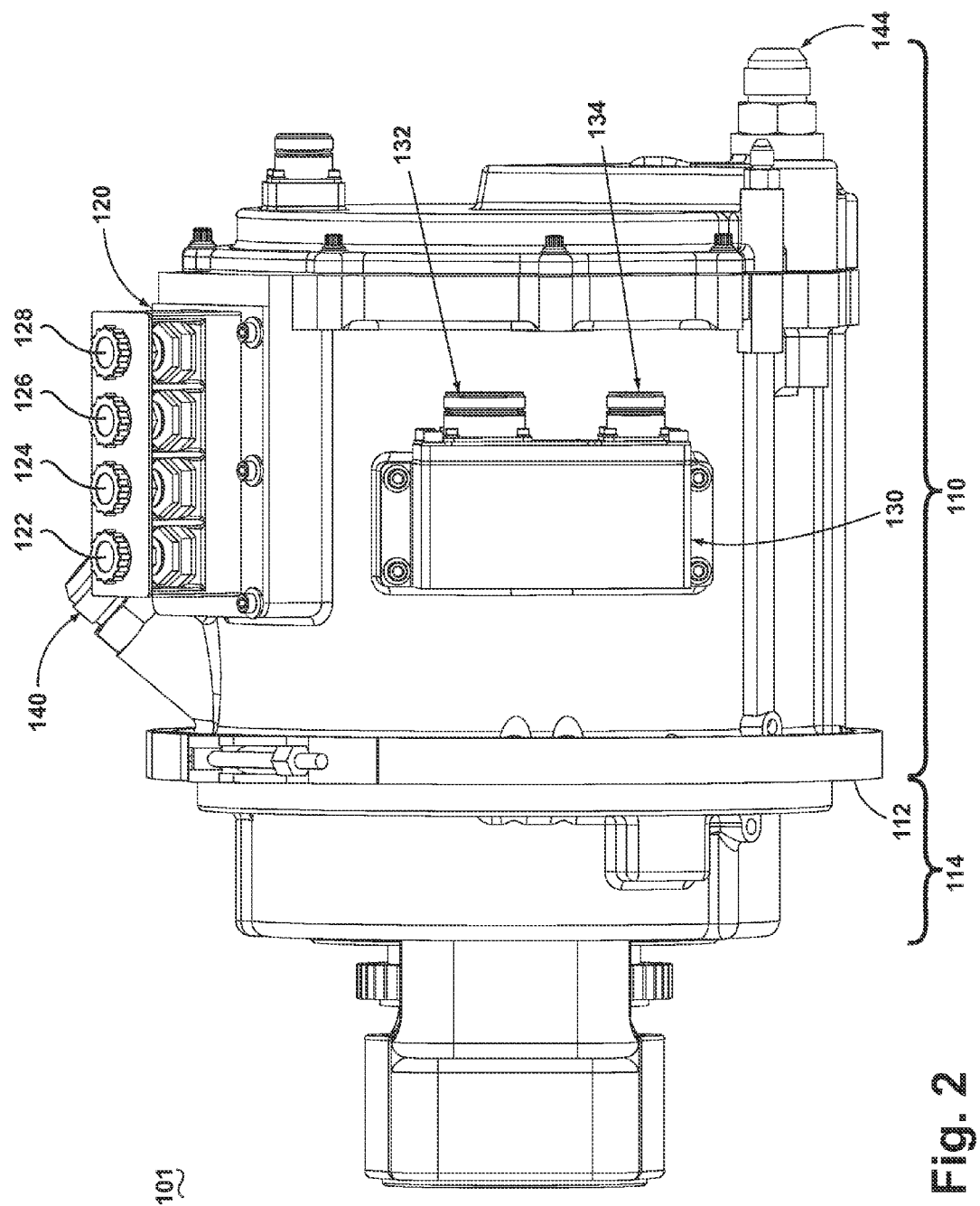
FIG. 2 is a schematic view of the exterior of a starter/generator.

FIG. 2 illustrates the S/G 101 according to one embodiment of the invention and which may be mounted to the AGB 100. The S/G 101 may be conceptually dividing into a first housing portion 110 that is external to the AGB 100 when the S/G is mounted on to the AGB 100, and a second housing portion 114 that nests within the AGB 100 when the S/G 101 is mounted on to the AGB 100. A clamping interface 112, used to clamp the S/G 101 to the AGB 100.

Multiple electrical connections are provided on the exterior of the S/G 101 to provide for the transfer of electrical power to and from the S/G 101. The electrical connections comprise a first power connector assembly 120 containing electrical power connections 122, 124, 126, and 128. These power connection may be for a three phase with ground reference output from the S/G 101. The electrical power connections 122, 124, 126, and 128 may be connected by cables to an electrical power distribution node of an aircraft to power various items on the aircraft, such as lights and seatback monitors. There may be a second power connector assembly 130 comprising electrical connections 132 and 134. These electrical connections are to electrically interface with the other components within the S/G 101.

As illustrated, the S/G 101 is oil cooled, and an oil inlet port 140 and an oil outlet port 144 are provided for controlling the supply of oil to and from the S/G. The cooling oil may be used to dissipate heat generated by the electrical and mechanical functions of the S/G.

Figure 3:
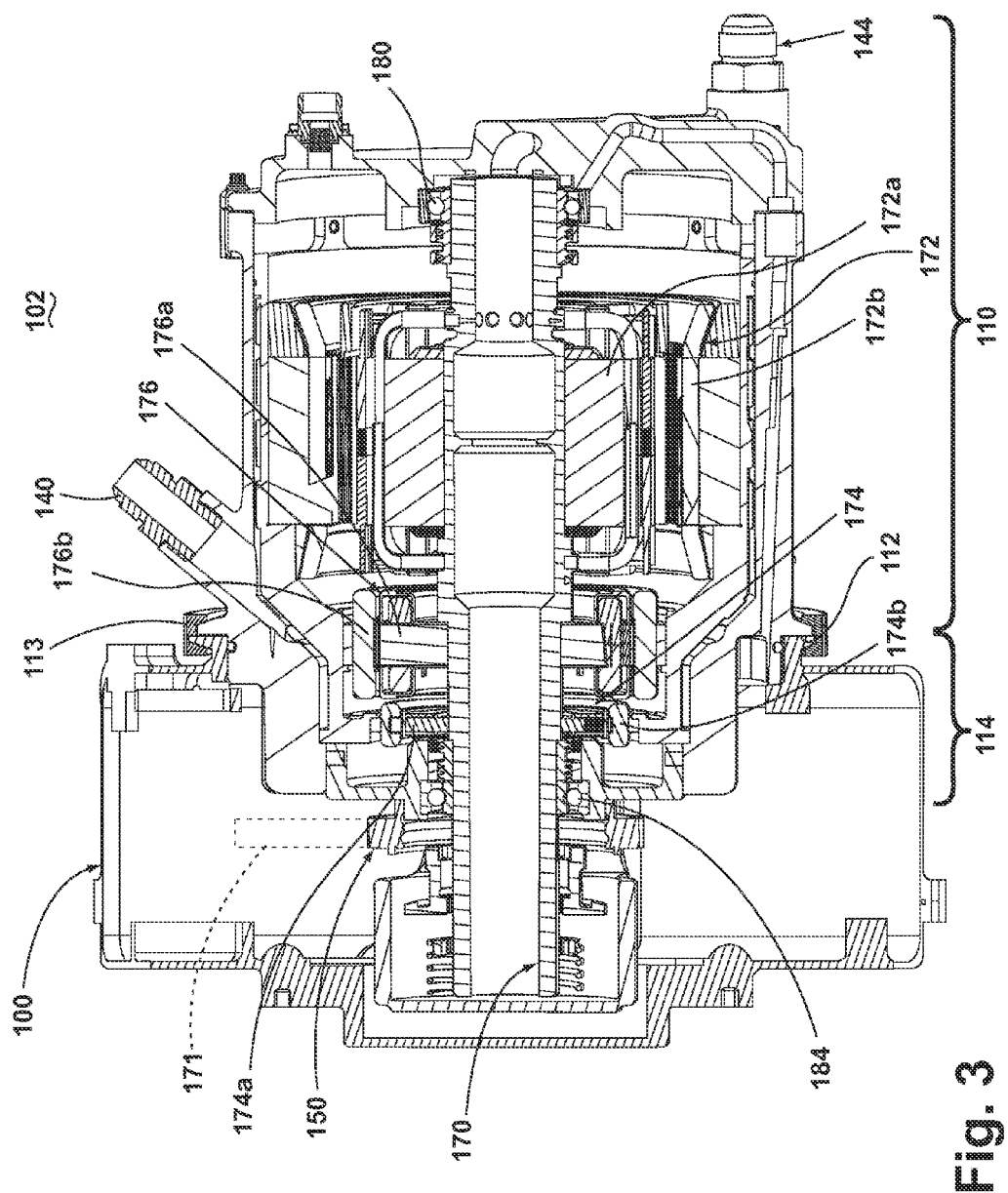
FIG. 3 is a schematic cross-sectional view of the starter/generator mounted to the accessory gearbox.

The interior of the S/G 101 is best seen in FIG. 3, which is a sectional view of the S/G 101 coupled to the AGB 100. A rotatable shaft 170 is located within the S/G and is the primary structure for supporting a variety of components, including components, within the S/G. The diameter of the rotatable shaft 170 may be fixed or vary along the length of the rotatable shaft 170. The rotatable shaft 170 is supported by spaced bearings 180, 184.

One component, a pinion gear 150, is provided on the rotatable shaft 170 and engages a drive gear 171 (shown schematically as a box) in the AGB when the S/G 101 is coupled to the AGB 100. The drive gear is coupled by a gear train to the power take off 90. In this way, the power take off from the engine 1 may be used to drive the S/G 101 via the AGB 100.

Several of the components of the S/G 101 have a fixed component and a rotating component, with the rotating component being provided on the rotatable shaft 170. Examples of these components comprise a main machine 172, an exciter 176, and a PMG 174, with the corresponding rotating component comprising a main machine rotor 172a, an exciter rotor 176a, and a PMG rotor 174a, respectively, and the corresponding fixed component comprising a main machine stator 172b, an exciter stator 176b, and a PMG stator 174b. The fixed components may be mounted to any suitable part of either/both the first housing portion 110 and second housing portion 114. The exciter 176 provides direct current to the field windings of the main machine 172. The main machine 172 and PMG 174 supply AC electrical power when the rotatable shaft 170 rotates.

The components may be any combination of known motors and generators. For example, the main machine could be either a synchronous or asynchronous generator. In addition to the accessories shown in this embodiment, there may be other components that may need to be operated for particular applications. For example, in addition to the electromechanical accessories shown, there may be other accessories driven from the same rotatable shaft 170 such as an oil pump, a fluid compressor, or a hydraulic pump.

The S/G 101 is attached to the AGB with a clamp 113 clamping the clamping interface 112 of the S/G 101 to the housing of the AGB 100. The first housing portion 110 of the S/G 101 is shown to be outside of the of the housing of the AGB 100 opening while a portion of the second housing portion 114 of the S/G 101 is nested within the opening of the housing of the AGB 100.

The location of the exciter 176 and PMG 174 between the main machine 172 and the pinion gear 150 is beneficial in that it reduces the moment from the various accessories carried by the shaft and which act on the pinion gear 150 and its mating with the drive gear 171. The nesting of the S/G within the AGB further reduces the moment.

This moment is commonly referred to as the overhung moment which is approximately equal to the distance between the pinion gear 150 to the center of mass of the assembly 102 multiplied by the weight of the assembly.

The value of these benefits become more clear when one understands and appreciates the spatial limitations of the S/G 101 in a turbine engine environment, in which physical space is at a premium (reduced physical size ultimately means less aerodynamic drag the thrust must overcome and less weight an airplane must carry), and the required power output from the main machine. The spatial restrictions and power requirements tend to push design of the main machine toward lower pole counts, in that it reduces the overall weight and size of the S/G 101 and the overall assembly 102. However, lower pole counts require faster rotational speeds to achieve the desired power output. Additionally, since soft materials such as silicon-iron alloys are commonly used, low pole counts help reduce excessive core losses that result from high frequency magnetic field switching. High frequency switching of the magnetic field may also generate a high level of heat that is difficult to remove from the assembly 102. As a result low pole count motors and generators are used within the S/G 101. In one embodiment the main machine may have a pole count as low as two. As a result of using low pole count motors and generators, an assembly configuration 102 that minimizes the overhung moment of the assembly 102 and maximizes the rotational speed of the rotatable shaft 170 is desired to maximize power output. The relative locations of the PMG 174, exciter 176, and main machine 172 has an influence on the maximum critical rotational speed of the rotatable shaft 170 and the overhung moment of the assembly 102 of the S/G 101 mounted upon the AGB.

To maximize the rotational speed of the rotatable shaft 170, the span of length between the spaced bearings 180 and 184 should be minimized. To minimize the overhung moment, there is an advantage in locating the exciter 176 and the PMG 174 closer to the pinion gear 150 than the main machine 172. In one embodiment the PMG 174 with the PMG rotor 174a and PMG stator 174b is closest to the pinion gear 150 and the exciter 176 with the exciter rotor 176a and exciter stator 176b is between the PMG 174 and the main machine 172. Alternatively, the exciter 176 with the exciter rotor 176a and exciter stator 176b is closest to the pinion gear 150 and the PMG 174 with the PMG rotor 174a and PMG stator 174b is between the exciter and the main machine. All of the accessories are placed on the same side of the pinion gear 150 and the exciter 176 and the PMG 174 are placed closer to the pinion gear than the main machine 172.

By placing all of the accessories on the same side of the pinion gear 150, rather than splitting the accessories into two parts on either side of the pinion gear 150, the spaced bearings 180 and 184 can be placed closer together, thereby allowing for a greater rotational velocity of the rotatable shaft 170. A greater rotational velocity, in turn, produces a greater power output from low pole count generators. By using a low pole count generator the overall weight of the assembly is reduced, thereby reducing the overhung moment of the assembly 102. Additionally, by placing the PMG 174 and the exciter 176 closer to the pinion gear 150, portions of the S/G 101 containing the PMG 174 and/or the exciter 176 can be partially embedded within the opening of the AGB 100. By doing so, the center of mass of the assembly 102 moves closer to the pinion gear, thereby reducing the overhung moment of the assembly 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An assembly for a gas turbine engine comprising:
   an accessory gearbox having a first housing with opposing sides and defining a first interior, and a drive gear located within the interior;

a starter/generator comprising:
   a second housing defining a second interior and mechanically mounted to the accessory gearbox, the starter/generator;
   a rotatable shaft having a portion located within the second interior;
   a pinion gear carried by the portion of the shaft;
   a main machine carried by the portion of the shaft;
   a permanent magnet generator (PMG) carried by the portion of the shaft; and
   an exciter carried by the portion of the shaft;
   wherein the starter/generator is mounted to the accessory gearbox such that the second housing is located only on one side of the first housing and the PMG and exciter are located within the second housing on the portion of the shaft between the pinion gear and the main machine, which meshes with the drive gear when the starter/generator is mounted to the accessory gearbox; and
   wherein at least one of the PMG and exciter is located within the accessory gearbox when the starter/generator is mounted to the accessory gearbox.

2. The assembly of claim 1 further comprising a first bearing rotatably supporting the shaft and the PMG and exciter are located on the portion of the shaft between the first bearing and the main machine.

3. The assembly of claim 2 wherein the first bearing is located on the shaft between the pinion gear and the PMG and the exciter.

4. The assembly of claim 3 further comprising a second bearing rotatably supporting the shaft.

5. The assembly of claim 4 wherein at least one of the PMG, exciter, and main machine is located on the shaft between the first and second bearings.

6. The assembly of claim 1 wherein the PMG is located on the portion of the shaft between the exciter and the pinion gear.

7. The assembly of claim 6 wherein the first bearing is located on the portion of the shaft between the PMG and the pinion gear.

8. An assembly for a gas turbine engine comprising:
   an accessory gearbox comprising a first housing with an access opening and a drive gear located within the first housing;
   a starter/generator having a second housing mechanically mounted to the first housing, comprising:
      a pinion gear;
      a main machine;
      a permanent magnet generator (PMG);
      an exciter; and
      a shaft having a portion rotatably mounted within the second housing and the portion supporting the pinion gear, main machine, PMG, and exciter, with the PMG and exciter supported on the portion of the shaft between the pinion gear and the main machine;
   wherein the first and second housings are configured to nest such that when the second housing is mounted to the first housing, a portion of the second housing extends through the access opening and into the first housing to position at least one of the PMG and exciter within the first housing, and the second housing projects from the first housing on only one side of the first housing, which meshes with the drive gear when the starter/generator is mounted to the accessory gearbox.

9. The assembly of claim 8 further comprising a first bearing rotatably supporting the shaft and the PMG and exciter are located on the shaft between the first bearing and the main machine.

10. The assembly of claim 9 wherein the first bearing is located on the shaft between the pinion gear and the PMG and the exciter.

11. The assembly of claim 10 further comprising a second bearing rotatably supporting the shaft.

12. The assembly of claim 11 wherein at least one of the PMG, exciter, and main machine is located on the shaft between the first and second bearings.

13. The assembly of claim 12 wherein the PMG is located on the shaft between the exciter and the pinion gear.

14. The assembly of claim 13 wherein the first bearing is located on the shaft between the PMG and the pinion gear.

15. The assembly of claim 14 wherein at least one of the PMG and exciter is located within the accessory gearbox when the starter/generator is mounted to the accessory gearbox.

* * * * *